(12) United States Patent
Nishinaga et al.

(10) Patent No.: US 9,731,735 B1
(45) Date of Patent: Aug. 15, 2017

(54) SYSTEM AND METHOD OF ESTIMATING VALUES FOR COMMANDS TO CAUSE VEHICLES TO FOLLOW A TRAJECTORY IN A COMPLEX TRACK NETWORK

(75) Inventors: Eugene Iwao Nishinaga, San Rafael, CA (US); Kevin Kohei Nishinaga, San Rafael, CA (US); Mark Lee, San Rafael, CA (US)

(73) Assignee: Cybertran International Inc., Richmond, CA (US)

( * ) Notice: Subject to any disclaimer, the term of this patent is extended or adjusted under 35 U.S.C. 154(b) by 961 days.

(21) Appl. No.: 13/323,779

(22) Filed: Dec. 12, 2011

Related U.S. Application Data

(63) Continuation-in-part of application No. 13/218,422, filed on Aug. 25, 2011, and a continuation-in-part of
(Continued)

(51) Int. Cl.
*B61L 25/00* (2006.01)
*B61L 3/00* (2006.01)
*B60W 50/00* (2006.01)

(52) U.S. Cl.
CPC .............. *B61L 25/00* (2013.01); *B60W 50/00* (2013.01); *B61L 3/00* (2013.01)

(58) Field of Classification Search
USPC ........ 701/2, 22, 41, 42, 467, 408, 31.4, 301, 701/117, 93; 318/430; 345/442;
(Continued)

(56) References Cited

U.S. PATENT DOCUMENTS 4,965,583 A 10/1990 Broxmeyer
2002/0143461 A1\* 10/2002 Burns et al. .................. 701/117
(Continued)

FOREIGN PATENT DOCUMENTS

JP 2010250773 A \* 11/2010

OTHER PUBLICATIONS

JPO2010-250773 machine translation.\*
(Continued)

*Primary Examiner* — Jelani Smith
(74) *Attorney, Agent, or Firm* — Pillsbury Winthrop Shaw Pittman LLP

(57) ABSTRACT

The invention relates to systems and methods that provide a higher degree of precision and a greater coordination of vehicle movement than is possible in conventional systems. A control system is designed to enforce vehicle movement along a route to a position versus time trajectory. The control system includes control equipment on the vehicle that reports its location on the track periodically. The controlling computer receives the report, and knowing where the vehicle should be and how fast it should be traveling at that point in time via a run definition table prepared for the route, calculates a position and velocity error, then calculates and sends a tractive effort adjustment command to the vehicle that attempts to reduce the position and velocity error. The invention includes a method for providing an estimated force command for a given target velocity and acceleration that can be used in the overall control methodology.

14 Claims, 6 Drawing Sheets

To perform this maneuver, cars A, B, and C have to approach the merge on a very precise position vs. time trajectory.

Related U.S. Application Data application No. 13/218,423, filed on Aug. 25, 2011, now abandoned, and a continuation-in-part of application No. 13/218,429, filed on Aug. 25, 2011, and a continuation-in-part of application No. 13/218,434, filed on Aug. 25, 2011, now Pat. No. 8,554,397.

(60) Provisional application No. 61/459,247, filed on Dec. 10, 2010.

(58) Field of Classification Search
USPC .......................................................... 446/456
See application file for complete search history.

(56) References Cited

U.S. PATENT DOCUMENTS

| 2007/0046677 | A1* | 3/2007 | Hong et al. ................... 345/442 |
| 2008/0015745 | A1 | 1/2008 | Gaegauf et al. |
| 2008/0154452 | A1 | 6/2008 | Kapp et al. |
| 2008/0167767 | A1 | 7/2008 | Brooks et al. |
| 2008/0294321 | A1* | 11/2008 | Yamakado et al. ............. 701/93 |
| 2010/0114407 | A1 | 5/2010 | Klooster et al. |
| 2010/0318247 | A1 | 12/2010 | Kumar |
| 2010/0319565 | A1 | 12/2010 | Mobasher |
| 2011/0190972 | A1* | 8/2011 | Timmons et al. ............... 701/29 |

OTHER PUBLICATIONS

Nishinaga, et al., "A Vehicle Collision Avoidance System Using Time Multiplexed Hexadecimal FSK", Boeing Aerospace Company, IEEE/Vehicular Technology Conference, vol. 33, 1983, pp. 171-182.

Burt, Hg.P., et al., "Microprocessor Control of Wheel Slip," IEEE, 1985, pp. 19-28.

* cited by examiner

SYSTEM AND METHOD OF ESTIMATING VALUES FOR COMMANDS TO CAUSE VEHICLES TO FOLLOW A TRAJECTORY IN A COMPLEX TRACK NETWORK

CROSS-REFERENCE TO RELATED APPLICATIONS

The present application is a continuation-in-part of U.S. patent application Ser. No. 13/218,422, filed Aug. 25, 2011. The present application is also a continuation-in-part of U.S. patent application Ser. No. 13/218,423, filed Aug. 25, 2011. The present application is also a continuation-in-part of U.S. patent application Ser. No. 13/218,429, filed Aug. 25, 2011. The present application is also a continuation-in-part of U.S. patent application Ser. No. 13/218,434, filed Aug. 25, 2011. The present application also claims priority to U.S. Provisional Application No. 61/459,247, filed Dec. 10, 2010. The contents of all such applications are incorporated herein by reference in their entirety.

FIELD OF THE INVENTION

The present invention relates to fixed guideway transportation systems, and more particularly to developing vehicle commands that can be used to cause the vehicle to follow a desired trajectory in a fixed guideway system.

BACKGROUND OF THE INVENTION

Modern mass rapid transit rail systems are very effective carriers of people. They are generally grade separated systems to enable vehicles to operate unaffected by automobile traffic, and thereby are able to achieve traffic densities otherwise unachievable. They are, however, very expensive. A typical, but conservative order of magnitude system capital cost for a system is approximately $100 million per bi-directional track mile of system, making it difficult for all but the largest and/or most affluent communities and cities to justify and/or afford the cost of new construction. This limitation has the effect of constraining the reach of these systems, and thus limiting the convenience to the users who can only ride the systems to the few locations to which guideway has been constructed. This results in a classic case of Catch 22. The high cost of systems requires a high ridership to justify the cost. However, high guideway costs limit construction and thus the reach of fixed guideway systems. This limits convenience to the riders, making it difficult to achieve the high ridership needed to justify the high cost.

Conventional mass rapid transit rail technology attempts to improve the ratio of benefits per unit cost by focusing on serving the commuting public. This means building systems to achieve very high passenger capacities to major employment centers. An example conventional system is shown in FIG. 1. As shown, conventional systems 110 achieve high capacities by building heavy infrastructure and operating long heavy trains 112 that typically carry a large number of riders to the few large employment centers 114, 116 that they can most effectively service, while bypassing smaller towns or communities 118, 120. This, however, requires very costly guideway 122 and station structures 124, 126, which limits the system's reach and thus convenience for the users, especially for those who want to travel to the generally more widely distributed retail, residential, or recreational destinations. With guideway 122 and station structures 124, 126 that must be built to handle long heavy trains 112 to support demand during commute hours, the result is an expensive but marginally justifiable solution for commute hour travel which is far too expensive to justify for other periods of the day and other destinations.

Other existing transportation systems that aim to be less expensive to build and operate include automated people mover (APM) systems, such as those operating in many modern airports and some cities. These systems are low speed/low capacity systems that operate driverless vehicles at speeds in the range of 25 to 30 mph and achieve line capacities in the range of 2,000 to 3,000 passengers per hour per direction. Given the limited speed and capacity of these systems, even with the somewhat lower cost of construction due to the use of smaller vehicles, the benefit per cost is still poor. Furthermore, with the lower speeds and line capacities, these systems are limited in utility to local service routes.

Another type of transportation system that has been discussed is called "personal rapid transit" (PRT). PRT's differ from the more common APM systems in that these systems are built with offline stations which allow higher traffic densities to be achieved. Typically these systems operate driverless cars that seat four to six people and can provide service on a personal demand-driven basis. However, with the very small cars, high speeds are difficult to achieve and line capacities are severely restricted. There is one PRT that is operating at West Virginia University, the Morgantown PRT, which is an 8.2 mile long system having cars that seat 20 people. With a claim of 15 second headways, a line capacity of 4,800 passengers per hour per direction can be achieved. With rubber-tired vehicles, however, the top speed of the system is 30 mph thus limiting its applicability to low speed local service lines.

Co-pending application Ser. No. 13/218,422, the contents of which are incorporated by reference in their entirety, dramatically advanced the state of the art by providing a fixed guideway transportation system that can overcome many of the above and other challenges of the prior art. For example, the system of the co-pending application includes driverless vehicles carrying 10 to 30 persons designed for optimal ratio of benefits per cost. However, certain challenges remain.

For example, in order to cost effectively build and operate a system that operates smaller vehicles such as those contemplated by the co-pending application, yet achieves line capacities that justify the cost of constructing track infrastructures, the density of traffic that can be achieved needs to be sufficiently high. That means that safe operating headways must be made smaller than those achievable with conventional control systems that represent today's state of the art. Furthermore, these safe operating headways should be achieved at mass rapid transit speeds (at least 60 mph). This cannot be achieved with current systems.

Safe operation further requires that vehicles must always be able to stop before arriving at obstacles on the track. With all track geometries (i.e. grade, track curvature) being equal, the greatest restriction will occur where there are fixed obstacles (i.e. zero speed obstacles) in the path of the vehicle. Therefore, in order to achieve high traffic densities, it is desirable to eliminate the existence of fixed location obstacles on the track, such as switch points between tracks.

Relatedly, since a collision between two vehicles is a life-threatening event, control functions that prevent collisions are critical to safety. In the rail industry, control that is critical to safety must be designed and implemented to a standard commonly referred to as "vital." In recent years achieving vital status has required an analytical demonstration of a Mean Time Between Unsafe Event or Hazard (MTBH) of $10^9$ hours or greater. Accordingly, any methodology aimed at increasing traffic density by removing fixed obstacles such as track switches should include collision protection satisfying this standard.

When smaller, lighter vehicle are made to operate on smaller track structures, more complex track routes become possible as systems that reach deeper into communities can be constructed. Driverless operation on complex track networks require the management of traffic through many merges and diverging track routes. This requires a higher degree of precision and a greater coordination of vehicle movement. Accordingly, there remains a need in the art for methods and systems that enable this level of control.

SUMMARY OF THE INVENTION

The present invention relates generally to ground transportation systems, and more particularly to a fixed guideway transportation system that achieves a superior cost benefit ratio, is lower in net present cost and thus more easily justified for lower density corridors, and can provide passenger carrying capacities appropriate for higher density corridors serviced by mass rapid transit systems today. According to certain aspects, the present invention includes systems and methods that provide a higher degree of precision and a greater coordination of vehicle movement than is possible in conventional systems. For example, a control system according to the invention is designed to enforce vehicle movement along a route to a position versus time trajectory. The control system includes control equipment on the vehicle that reports its location on the track every 0.5 seconds. The controlling computer in the station receives the report, and knowing where the vehicle should be and how fast it should be traveling at that point in time via a run definition table prepared for the route, calculates a position and velocity error, and then calculates and sends a tractive effort (force) adjustment command to the vehicle that attempts to reduce the position and velocity error. According to further aspects, the present invention includes a method for providing an estimated force command for a given target velocity and acceleration that can be used in the overall control methodology.

In furtherance of these and other aspects, a method of controlling a vehicle in a transportation system according to embodiments of the invention includes receiving a table that defines a trajectory for the vehicle; developing a target acceleration for the vehicle based on the trajectory; and using the target acceleration to develop commands to cause the vehicle to follow the defined trajectory.

In additional furtherance of these and other aspects, a system for controlling a vehicle in a transportation system according to embodiments of the invention includes a master computer, remote from the vehicle, that creates a table that defines a trajectory for the vehicle; and a computer remote from the master computer that: develops a target acceleration for the vehicle based on the trajectory; and uses the target acceleration to develop commands to cause the vehicle to follow the defined trajectory.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
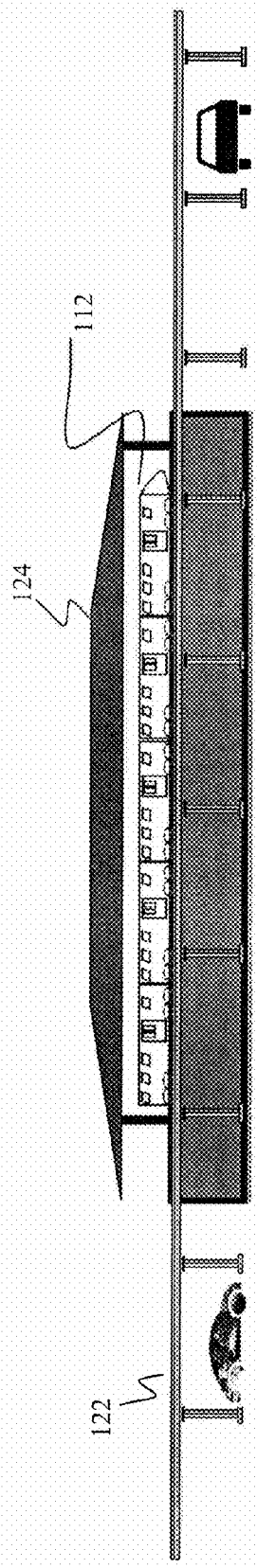
FIG. 1 illustrates a conventional mass transit system.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the invention of the co-pending application enables the construction of rail lines that: 1. achieve a superior amount of benefits per cost; 2. are lower in cost and thus more easily justified for lower density corridors; and 3. can provide passenger carrying capacities appropriate for higher density corridors serviced by mass rapid transit systems today.

In certain embodiments, these objectives are met by utilizing smaller vehicles that can operate on a less expensive infrastructure. Using certain methods according to the co-pending application, the costs of fixed guideway mass rapid transit systems are reduced, allowing more destinations to be accessed. Also, with certain methods according to the co-pending application, the same structures appropriate for low ridership corridors and/or service hours can be used to achieve passenger carrying capacities needed for the high capacity corridors served today by modern mass rapid transit systems.

According to further aspects, the invention of the co-pending application improves the amount of benefits per cost of rail transit by reducing the cost to levels more justifiable for low density corridors. To be meaningful, certain methods according to the co-pending application achieve improved benefits per cost in a holistic manner, in other words, by reducing the net cost of ownership which includes not only the cost of equipment but also the net cost of operating and maintaining the system.

Although the principles of the inventions of the co-pending application and the present application will be explained in connection with applications to conventional diesel and/or electrified rail systems, the invention is not limited to these types of systems. For example, the principles of the invention can be extended to conventional and other vehicle technologies that do not rely on steel wheels rolling on steel rail.

Figure 2:
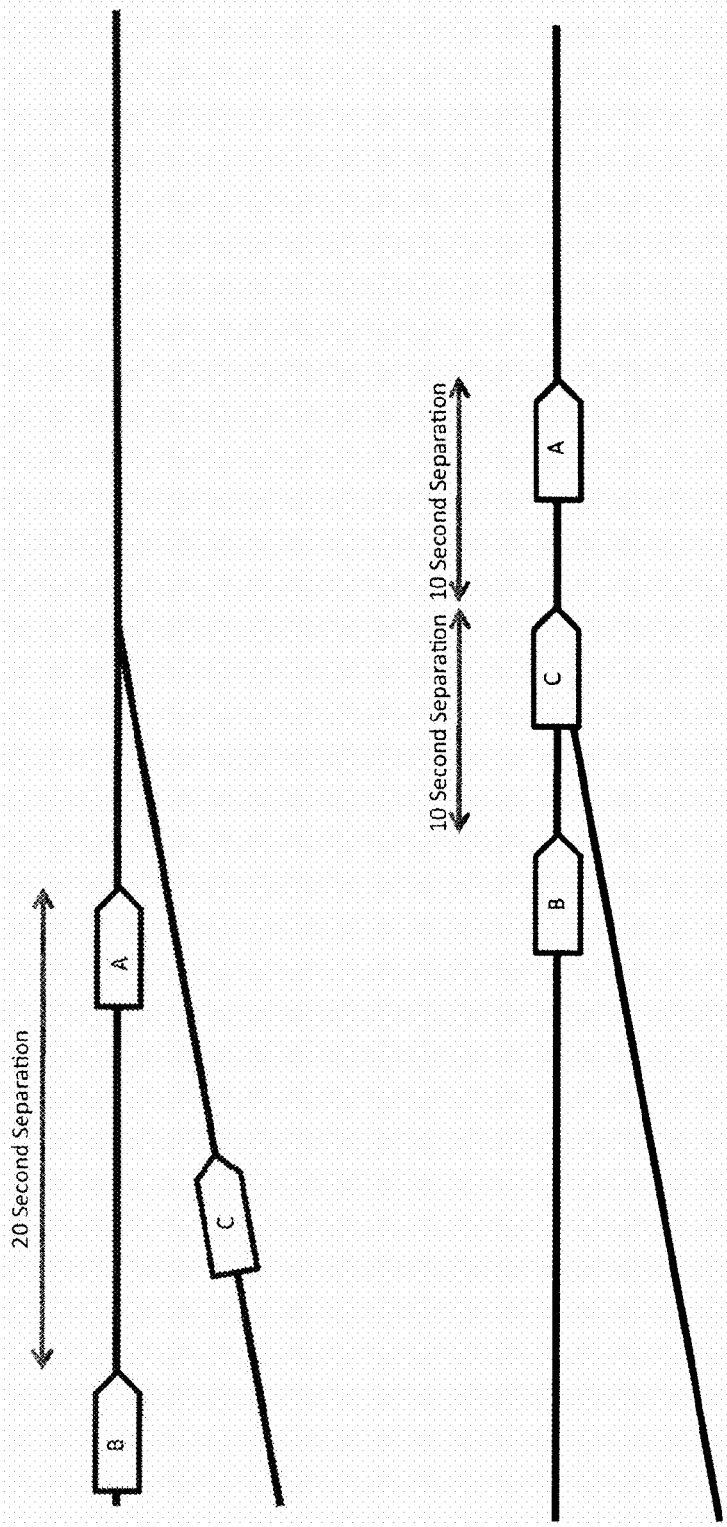
FIG. 2 illustrates aspects of an example method of controlling vehicles according to the invention.

According to certain aspects, the present invention further improves upon the invention of co-pending application Ser. No. 13/218,429. In the system described in the co-pending application, the ability to control vehicles through complex track networks including frequent merging of vehicle traffic is required. This is illustrated in FIG. 2 which depicts a situation where one vehicle is being made to merge onto a line in between two other vehicles arriving at the merge point from a different leg of the merge. The inventions of co-pending application Ser No. 13/323,768 and Ser. No. 13/323,774 provide one way to perform this operation, the contents of which are incorporated by reference herein. In embodiments, a control system according to these inventions is designed to enforce vehicle movement in alignment with a pre-defined position versus time trajectory. The control system includes control equipment on the vehicle that reports its location on the track every $t_{frame}$ milliseconds (assume $t_{frame}$=500 ms in this example) and a control computer in the station that, knowing where the vehicle should be at every instant in time, sends tractive effort commands that are calculated in the station to attempt to cause the vehicle to follow the desired position versus time trajectory.

Figure 3:
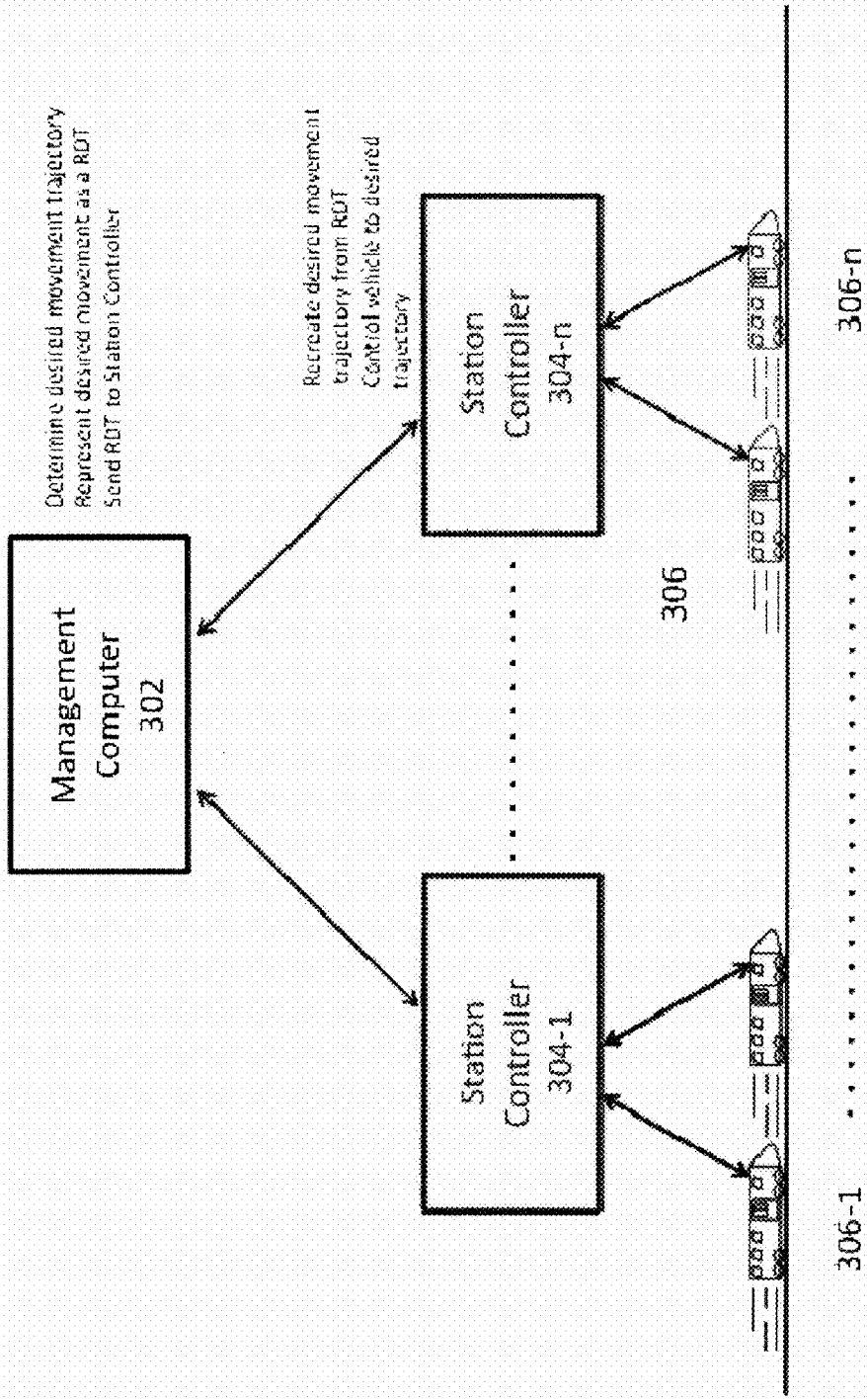
FIG. 3 is a block diagram that illustrates an example control system according to embodiments of the invention.

Certain aspects of the invention will now be explained in connection with FIG. 3. In embodiments, the control is achieved with three layers of control. At the highest level is the management computer 302. It is here where the trajectory is developed and defined. This computer would typically be located at a central dispatch/control facility and is in communication with a multiplicity of station control computers 304 which enforce the trajectory in concert with control equipment in the vehicles 306. Typically, station control computers 304 are distributed throughout a large system and housed in station structures. At the lowest level are the controllers that reside on each vehicle 306. These are interface controllers that serve as the interface between control functions and the physical elements that are the being controlled. The trajectory is defined by "Run Definition Tables" that contain the information necessary for the calculation of the trajectory (position versus time plot). The nature of and one example methodology for creating run definition tables is described in co-pending application Ser. No. 13/323,768. The present disclosure describes one example methodology for using the run definition tables as the basis of control. To note here is that the control of switching and doors are also control functions that can be achieved with run definition tables. However, these methods will not be described in detail for sake of clarity of the invention.

The station computer 304 and the vehicle controller 306 can be implemented by system elements of a communication-based control system such as that described in co-pending application Ser. No. 13/218,429. Those skilled in the art will understand how to adapt the system described in the co-pending application, as well as alternative systems, with the functionality of the present application after being taught by the present disclosure. As mentioned above, it should be apparent that multiple station control computers 304 can be in communication with a given vehicle 306 at any time during its route, requiring hand-off procedures between such computers 304, perhaps in coordination with management computer. However, details thereof will be omitted here for sake of clarity of the invention. According to certain aspects, the present invention includes a method of controlling vehicles to track the trajectories defined by run definition tables. One example control system whereby the control needs set forth above are achieved implements the overall process steps described in more detail below. (Note: As described in co-pending application Ser. No. 13/218,434, additional safety is assured by a separate process referred to as the Collision Avoidance Function, which can be used in conjunction with the present invention.)

a. Step 1: The management computer 302 uses information about the track and the location and behavior of other vehicles in the system to determine a desired movement trajectory for car n. The desired movement trajectory defines the desired vehicle location in the system for every instant in time.

b. Step 2: The management computer 302 calculates and develops a table of values, referred to hereafter as a Run Definition Table (RDT), that uniquely represents the desired movement trajectory, but is not of itself a table of position and time values.

c. Step 3: The management computer 302 sends the RDT for car n to the station control computer 304 where an algorithm is executed that calculates and re-creates the desired movement trajectory originally developed in the management computer 302.

d. Step 4: The controller in vehicle 306 updates the station control computer 304 with a position report every $t_{frame}$ and the station control computer then compares the reported position with the desired movement trajectory and if the two are not aligned, calculates and sends the vehicle controller 306 a correction command to attempt to cause the vehicle to follow the desired movement trajectory.

An example system and method for creating run definition tables that can be used in the present invention are described in more detail in co-pending application Ser. No. 13/323,768. According to certain aspects, the present invention is directed to controlling vehicles to follow the trajectory defined by such run definition tables, after further processing to develop force commands as described herein and in co-pending application Ser. No. 13/323,774.

As described more fully in application Ser. No. 13/323,768, the run definition table is a table of times and jerk rate values that describes the desired longitudinal movement of the vehicle. It is created in the management computer to represent the desired trajectory and then sent to the station controller where it is used to recreate the desired trajectory. Since the closed loop control of the vehicle attempts to cause vehicle movement to follow the pre-defined location and velocity as a function of time, the station controller must determine from the jerk values contained in the RDT, the target location and velocity for the vehicle at each instant of time. Moreover, a correction factor must be calculated in the station and sent to the vehicle to control the vehicle motors to cause the vehicle to follow the desired trajectory.

In embodiments, the target locations and velocities are needed by the station controller every 500 ms when new reports are received from the target vehicle and a new command must be developed to enforce vehicle movement. Thus, the calculation of location and velocity is performed only once every 500 ms. However, in the management computer where the RDT is created, the times at which jerk values change are not developed with any consideration for the times when the station controller will calculate the trajectory information. As a result, the times when the jerk value must change will not, in most cases, synchronize with the times when the trajectory calculation is made. This will introduce an error in the trajectory calculation that likely will be greater than what can be tolerated. It is therefore necessary to account for this lack of synchronization between the times when the RDT defines jerk rate changes and the times when the station controller calculates new position and velocity targets. The pseudo code developed below describes one example method of accounting for this lack of synchronization.

In embodiments, the times in the RDT table are not absolute times but are relative times from the start of each program execution. Therefore, when the station controller is initiated with a given trajectory for a vehicle, the time reported by the system clock will be recorded and used as a reference point from which all relative times will be calculated. This relative time will be the time used when calculating trajectories from the RDT file.

One example process for determining current vehicle state and trajectory using a run definition table according to embodiments of the invention is described in co-pending application Ser. No. 13/323,774. In embodiments, the control method described in the co-pending application determines how to control a vehicle based on the current trajectory in two steps. First, an open loop estimation of the motion command value is calculated based on the pre-calculated trajectory. In other words, a determination is made as to the likely motion command value that will cause the vehicle to follow the trajectory assuming a nominal vehicle. Second, a closed loop correction factor is calculated using actual feedback data from the actual vehicle movement. The open loop estimation value and the closed loop adjustment factor are then combined to form the controlling command to the vehicle. One example of performing the second of these two steps is described in more detail in co-pending application Ser. No. 13/323,774. The first step described above is the subject matter of the present application.

The following describes an example methodology for creating a mathematical function that estimates a force command that will cause the vehicle to move as defined in a trajectory. An example system according to embodiments of the invention operates vehicles and adjusts motor force commands with a pulse width modulated (PWM) voltage, so the discussion in this section will reference this example. However, those skilled in the art will understand how to implement the principles of the invention in alternative types of systems.

In general, the following describes a method of predicting a PWM command to the vehicle that will achieve a target rate of acceleration at the varying speeds achievable by the vehicle. The end result of this process will be an equation that computes PWM($v_{current}$, $a_{target}$), i.e. PWM as a function of the target acceleration and the current speed of the vehicle. It is noted that the mathematical function developed by the methods described herein can be used to compute a PWM command for any achievable velocity and acceleration combination. As such, the function can use as its domain for example, $V_{target}$ in place of $V_{current}$, or in the case of the acceleration $a_{calculated\ optimal}$ in place of $a_{target}$. In the latter case, the "calculated optimal" acceleration would be an acceleration value that is calculated to cause the vehicle to achieve the target velocity and location in accordance with a selected performance criteria (e.g. as quickly as possible, as smoothly as possible, etc.)

Figure 4:
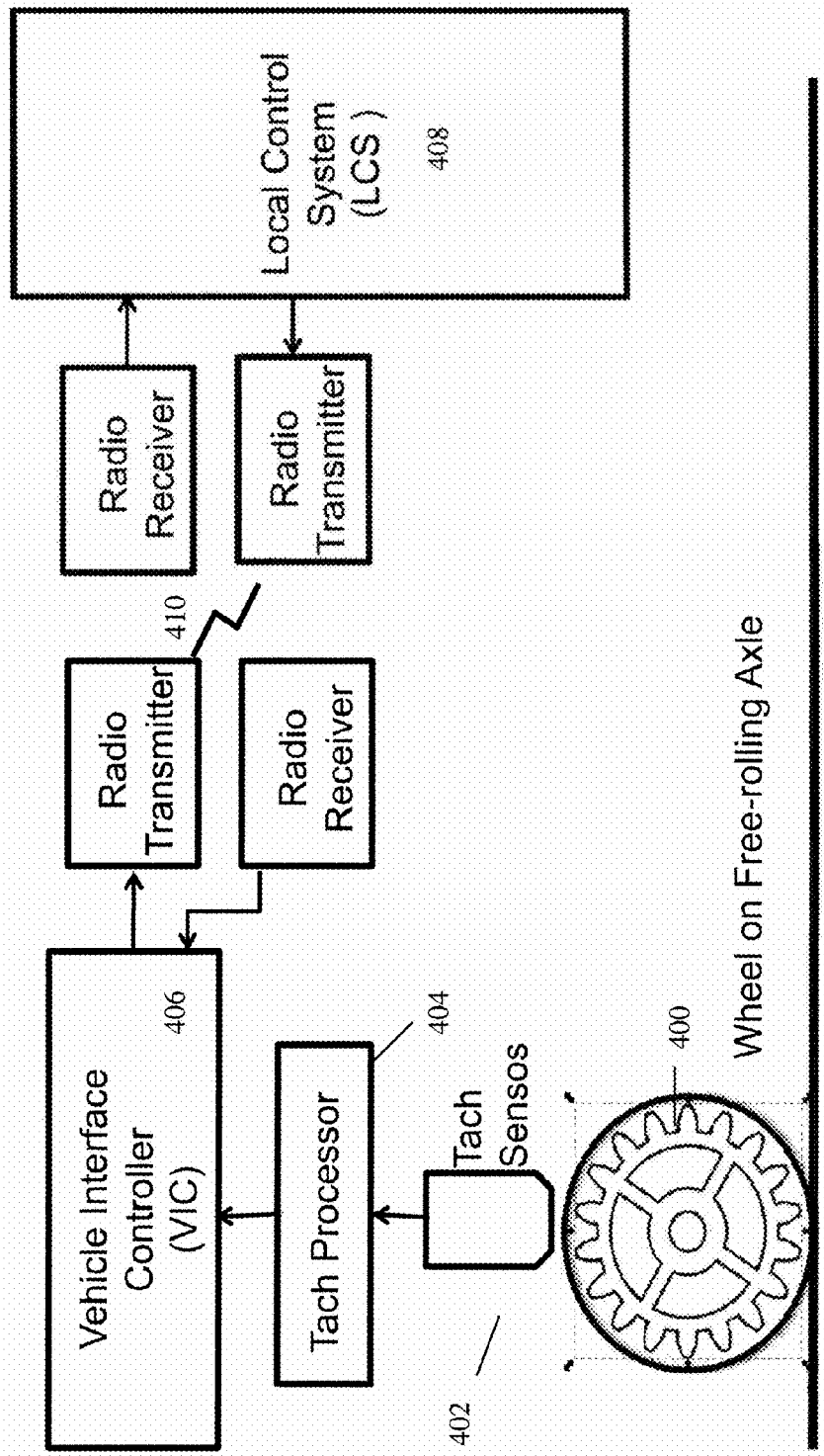
FIG. 4 is a block diagram illustrating an example vehicle control mechanism that can implement the control methodology according to embodiments of the invention.

As shown in FIG. 4, an example vehicle 306 according to embodiments of the invention uses a toothed tachometer gear attached to a wheel 400 on a free-rolling axle of the vehicle to detect and measure vehicle motion. An optical sensor 402 connected to a Tach Processor 404 detects wheel rotation and provides a pulse count to the Vehicle Interface Controller (VIC) Processor 406 that in turn communicates the number of pulses counted since the last transmission (500 ms earlier) to the Local Control System (LCS) 408 in the station controller 304 via a radio link 410 between the VIC and the LCS processors. The LCS processor 408 then integrates pulse counts to determine a total distance traveled or differentiate the pulse counts to determine vehicle speed.

Communication from the LCS 408 to the VIC 406 is also possible via a separate radio link 410 that handles information flow from the LCS to the VIC. The LCS 408 can therefore send a Pulse Width Modulation command to the VIC 406 to cause the VIC 406 to drive the vehicle motor in accordance with this command. In embodiments of the invention, LCS 408 and VIC 406, as well as the infrastructure by which they communicate with each other can be implemented by a communication-based control system such as that described in co-pending application Ser. No. 13/218,429. Those skilled in the art will understand how to adapt the system described in the co-pending application, as well as alternative systems, with the functionality of the present application after being taught by the present disclosure.

The following describes the steps to be taken to create the required function for estimating a force command in example embodiments of the invention.

Step 1—Data Collection: The first step in the process is to collect vehicle performance data from which the estimation function can be created.

For this, multiple vehicle runs are made with the LCS 408 commanding a different constant PWM level for each run. Tachometer reports are recorded in the LCS 408, which calculates the first and second derivatives of the pulse count (velocity and acceleration, respectively) and saves this for later analysis. To reduce the effects of random measurement error, multiple runs (e.g. at least five) at each PWM level should be made.

Figure 5:
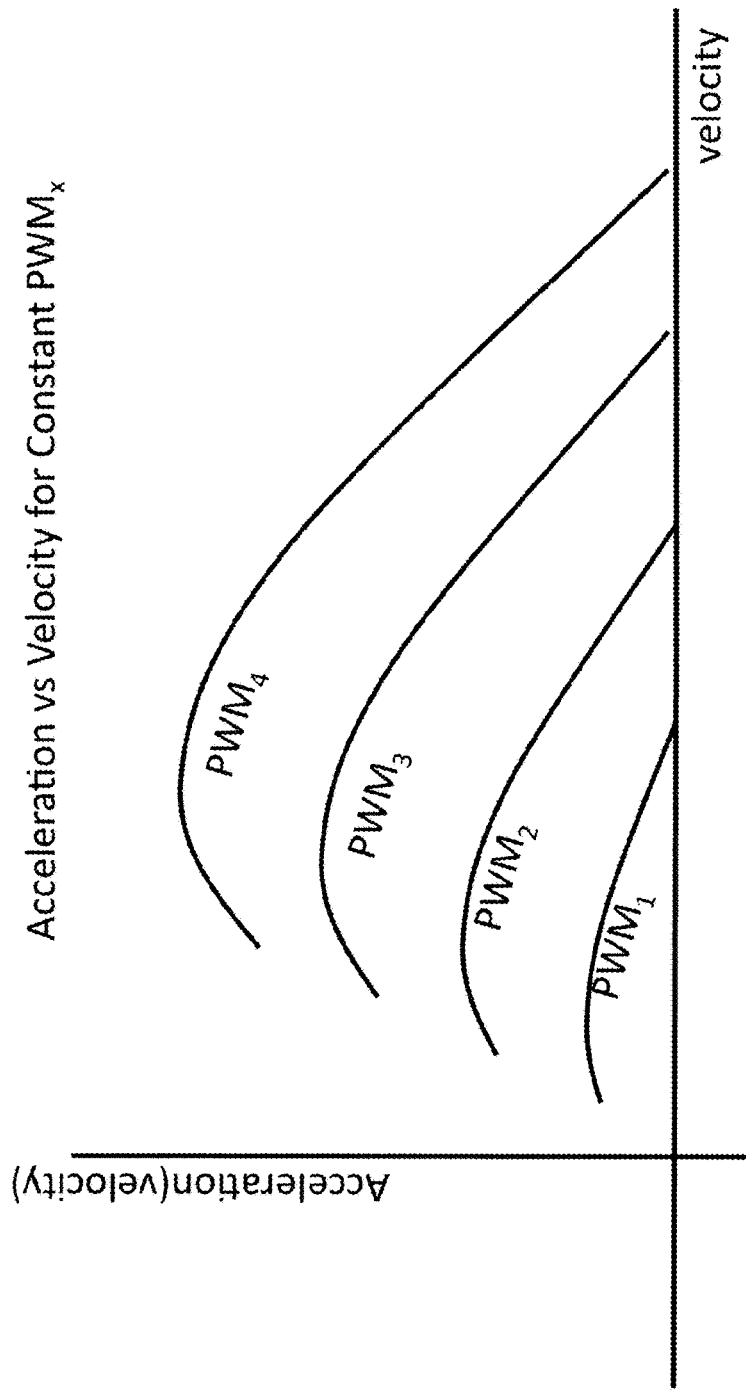
FIGS. 5 and 6 further illustrate principles of determining a generalized function for estimating a force command that can be used in a control methodology according embodiments of the invention.

Plotting this data for each distinct PWM level (with the higher subscripted PWM values being greater than the lower subscripted values) produces a family of curves as shown in FIG. 5.

A point to note here is that for the lower PWM values, the acceleration falls off rapidly at the higher velocities such that before the velocity reaches the higher speeds achieved with the higher PWM commands, the ability to accelerate reduces down to zero. This is as expected because with the lower PWM values, one would expect that the higher speeds cannot be attained. Also, it is likely that at the higher PWM values, acceleration data at the low velocities will not appear on the plot. This is because with the high PWM values, the speed increases so rapidly at the low speeds that there are not many measurements taken in the few 500 ms intervals that occur before the vehicle achieves the higher speeds.

Step 2—Mathematical Representation of the Acceleration vs. Velocity Curves: Using a trendline function, second order polynomial equations to represent each of the lines plotted can be developed with the data collected. For each $PWM_X$ line, there is an equation of the form:

$$acc_x[vel]=a_x*vel^2+b_x*vel+c_x$$

Since for each PWM level, there have been multiple runs, a different set of coefficients for each run can be created, and then an average set coefficient values and standard deviations for each coefficient can be calculated for each PWM level.

If the standard deviation is small, for example within +/−20% of the average value, it can be concluded the data taken was good and the average coefficient values can be used to represent the car behavior at each PWM level. Otherwise, the quality of the data collected may be suspect, and it may be desired to repeat the data collection.

With the averages now calculated, the following expressions can be used:

$$acc_x[vel]=a_{x\ avg}*vel^2+b_{x\ avg}*vel+c_{x\ avg}$$

Step 3—Expressing a, b, c Coefficients as a Function of PWM Values: From Step 2, there are now values of $a_{x\ avg}$, $b_{x\ avg}$, and $c_{x\ avg}$ for each PWM level. Plotting these average values as a function of PWM then produces plots for each of $a_{avg}(PWM)$, $b_{avg}(PWM)$, and $c_{avg}(PWM)$ which can then again be captured by trendline equations, resulting in equations for a, b, and c as follows:

$$a_{avg}(PWM)=A_1*PWM^2+A_2*PWM+A_3$$

$$b_{avg}(PWM)=B_1*PWM^2+B_2*PWM+B_3$$

$$c_{avg}(PWM)=C_1*PWM^2+C_2*PWM+C_3$$

Step 4—Expressing Acceleration as a Function of PWM and Velocity: With expressions for each of $a_{avg}(PWM)$, $b_{avg}(PWM)$, and $c_{avg}(PWM)$, the process goes back to the representations of acceleration and substitutes back the $a_{avg}(PWM)$, $b_{avg}(PWM)$, and $c_{avg}(PWM)$ coefficients to get the following expression:

$$acc[PWM,vel]=a_{avg}(PWM)*vel^2+b_{avg}(PWM)*vel+c_{avg}(PWM)$$

Which, fully expanded, becomes:

$$acc[PWM,vel]=(A_1*PWM^2+A_2*PWM+A_3)*vel^2+(B_1*PWM^2+B_2*PWM+B_3)*vel+(C_1*PWM^2+C_2*PWM+C_3)$$

Step 5—Solving for PWM Given a Selected acc and vel: Using the expression developed in Step 4 above, terms can be rearranged to get:

$$acc_{target}=(A_1v^2+B_1v+C_1)PWM^2+(A_2v^2+B_2v+C_2)PWM+(A_3v^2+B_3v+C_3)$$

Subtracting $acc_{target}$ from both side of the above equation results in:

$$0=(A_1v^2+B_1v+C_1)PWM^2+(A_2v^2+B_2v+C_2)PWM+(A_3v^2+B_3v+C_3)-acc_{target}$$

Which can now be solved using the Quadratic Equation:

$$PWM=\frac{-\beta_Q \pm \sqrt{\beta_Q^2-4\alpha_Q\gamma_Q}}{2\alpha_Q}$$

By setting:

$$\alpha_Q=A_1v^2+B_1v+C_1$$

$$\beta_Q=A_2v^2+B_2v+C_2$$

$$\gamma_Q=A_3v^2+B_3v+C_3-acc_{target}$$

Step 6—Populating a Matrix of PWM Values Using the Solution to the Quadratic: The solution for PWM developed in Step 5 above, allows calculating PWM values for a range of target accelerations and velocity values. Performing this calculation for acceleration and velocity values that start at low values and increase incrementally to higher and higher values should produce a matrix of PWM values that would allow selecting a PWM value for any target acceleration and target velocity that may be chosen (e.g. via a lookup table).

However, upon performing this calculation it can be noted that, for some combinations of velocities and accelerations, the quadratic is unable to produce real solutions because the quantity under the radical becomes negative. To make the function more generally applicable to all combinations of velocities and accelerations, the following Step 7 is preferably taken.

Step 7—Plotting and Developing Polynomial Expression for Step Velocities: To address the problem of not being able to calculate PWM values for some velocity and acceleration values, a family of curves can be plotted for PWM values for varying accelerations with each curve representing a constant velocity, as shown in FIG. 6.

Figure 6:
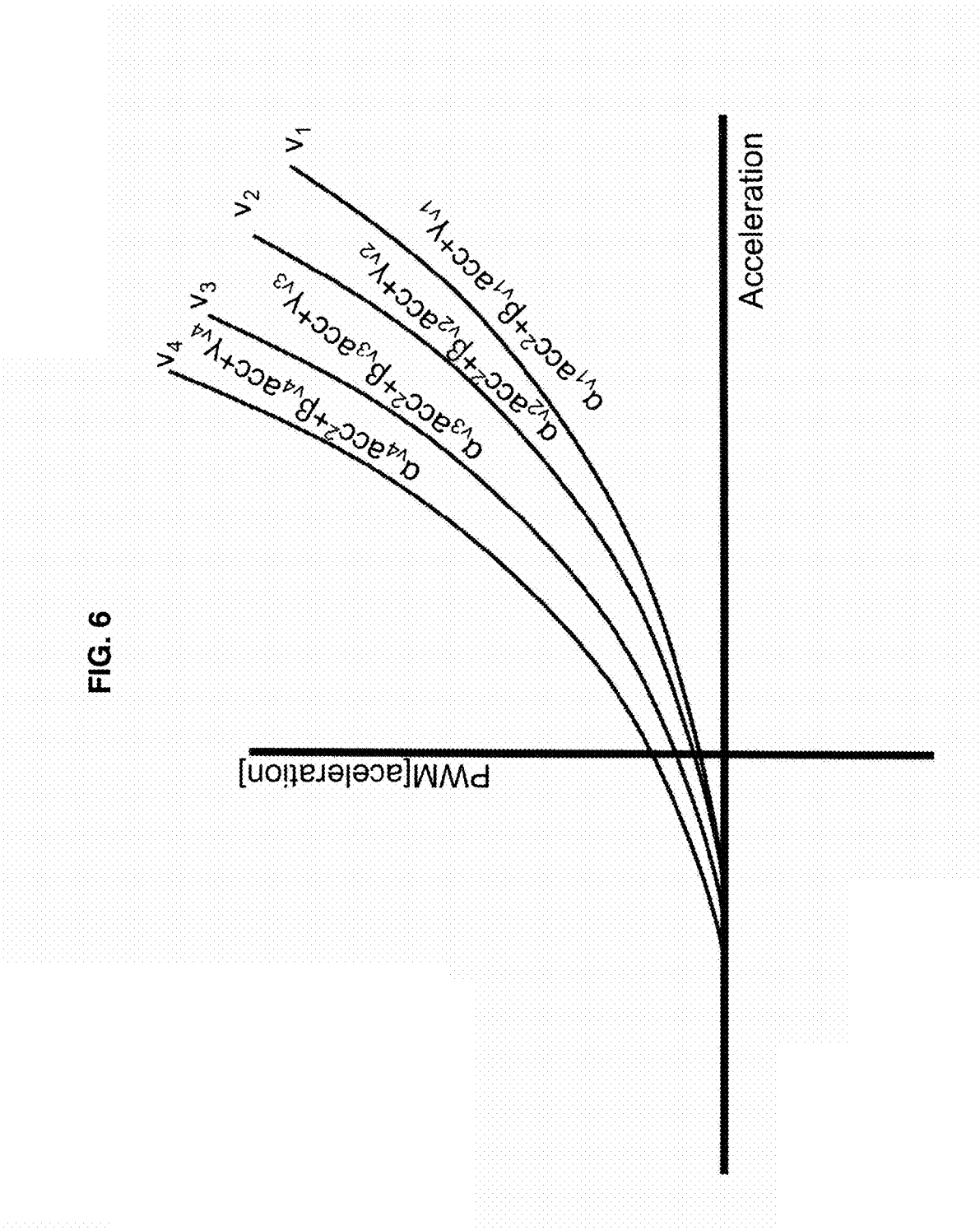

To develop an equation for each line plotted, a trendline function is again used to develop n-th order polynomial expressions for each line as shown in FIG. 6. (Note: Depending on the shape of the curves plotted, a 4th order curve fit may better approximate the lines than the 2nd order curve fits used earlier.)

Step 8—Developing Continuous Functions for the PWM Coefficients: Now if expressions for each of $\alpha_{vx}[vel]$, $\beta_{vx}[vel]$, and $\gamma_{vx}[vel]$ (assuming a 2nd order curve fit) can be developed, one can substitute back into the expressions for PWM[acc] and have equations that allow not only replicating the results already calculated with the quadratic, but also to extrapolate to velocities and accelerations that cannot be solved with the quadratic. As before, the expressions for $\alpha[vel]$, $\beta[vel]$, and $\gamma[vel]$ are developed by plotting each of $\alpha_{vx}$, $\beta_{vx}$, and $\gamma_{vx}$ as a function of velocity and having a trendline function produce coefficients that replicate the plotted values. This then produces the second order polynomial equations:

$$\alpha[vel]=\alpha_1*vel^2+\alpha_2*vel+\alpha_3$$

$$\beta[vel]=\beta_1*vel^2+\beta_2*vel+\beta_3$$

$$\gamma[vel]=\gamma_1*vel^2+\gamma_2*vel+\gamma_3$$

Step 9—Using the Expressions for the PWM Coefficients to Create the Function PWM[vel, acc]: Using the result of Step 8, all that it takes to estimate a PWM value for any target velocity and acceleration can be obtained. This is simply achieved by:

$$PWM[vel,acc]=\alpha[vel]acc^2+\beta[vel]\ acc+\gamma[vel]$$

or:

$$PWM[vel,acc]=(\alpha_1*vel^2+\alpha_2*vel+\alpha_3)*acc^2+(\beta_1*vel^2+\beta_2*vel+\beta_3)*acc+(\gamma_1*vel^2+\gamma_2*vel+\gamma_3)$$

With this estimate of the PWM value for a given velocity and acceleration, co-pending Application Ser. No. 13/323,774 describes how it can be used to cause a vehicle to follow a desired trajectory.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of controlling a vehicle in a transportation system, comprising:
   receiving a table that defines a trajectory for the vehicle;
   developing a target acceleration for the vehicle based on the trajectory;
   determining, for a motor of the vehicle, a first plurality of command estimates for a corresponding plurality of acceleration values; and
   using, by a computer associated with the vehicle, the target acceleration and the determined first plurality of command estimates to develop a particular command estimate to cause the vehicle to follow the defined trajectory.

2. The method according to claim 1, wherein the table comprises a plurality of jerk values for a corresponding plurality of times.

3. The method according to claim 1, wherein the determining step further includes determining a second plurality of command estimates for a corresponding plurality of velocity values, and wherein the using step includes:
   obtaining a current velocity for the vehicle; and
   developing the particular command estimate using the target acceleration and current velocity and the first and second pluralities of command estimates.

4. The method according to claim 1, wherein the command estimates comprise PWM command estimates that are used to control a motor of the vehicle.

5. The method according to claim 3, wherein developing the particular command estimate includes looking up PWM values associated with the target acceleration and current velocity in a predefined table.

6. The method according to claim 3, wherein determining the first and second pluralities of command estimates includes:
   collecting vehicle performance data;
   creating a mathematical representation of acceleration vs. velocity using the collected data;
   expressing coefficients as a function of PWM values from the mathematical representation;
   expressing acceleration as a function of PWM and velocity using the coefficients;
   solving for PWM given a selected acceleration and velocity; and
   populating a matrix of PWM values using the solution.

7. The method according to claim 6, wherein for certain command estimates, the determining further comprises:
   developing a polynomial expression for certain velocity and acceleration values;
   developing a continuous functions of PWM coefficients using the polynomial expression; and
   using the expressions for the PWM coefficients to create a function that yields PWM values for continuous values of velocity and acceleration.

8. A system for controlling a vehicle in a transportation system, comprising:
   a master computer, remote from the vehicle, that creates a table that defines a trajectory for the vehicle; and
   a computer remote from the master computer that:
      develops a target acceleration for the vehicle based on the trajectory;
      determines, for a motor of the vehicle, a first plurality of command estimates for a corresponding plurality of acceleration values; and
      uses the target acceleration and the determined first plurality of command estimates to develop a particular command estimate to cause the vehicle to follow the defined trajectory.

9. The system according to claim 8, wherein the table comprises a plurality of jerk values for a corresponding plurality of times.

10. The system according to claim 8, wherein the remote computer further determines a second plurality of command estimates for a corresponding plurality of velocity values, and wherein the remote computer develops the particular command estimate by:
   obtaining a current velocity for the vehicle; and
   developing the particular command estimate using the target acceleration and current velocity and the first and second pluralities of command estimates.

11. The system according to claim 8, wherein the command estimates comprise PWM command estimates that are used to control a motor of the vehicle.

12. The system according to claim 10, wherein developing the particular command estimate includes looking up PWM values associated with the target acceleration and current velocity in a predefined table.

13. The system according to claim 8, wherein the remote computer is entirely implemented in a system that is remote from the vehicle.

14. The system according to claim 8, wherein certain portions of the remote computer are implemented in a system that is remote from the vehicle, and certain other portions are implemented in the vehicle.

* * * * *